Aug. 18, 1942. L. A. MUNCHOW 2,293,354
CONSTANT-POLARITY HOLDER FOR DRY CELLS
Filed Aug. 14, 1940
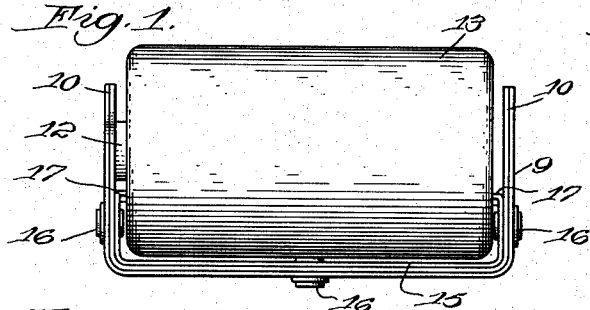
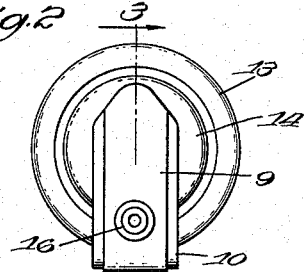
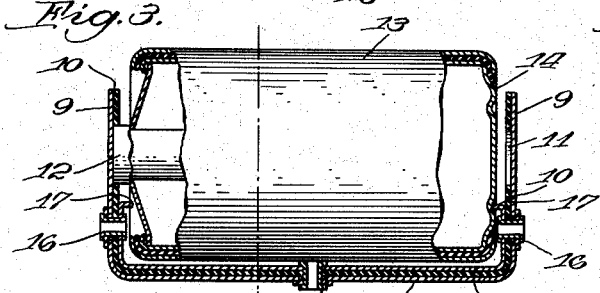
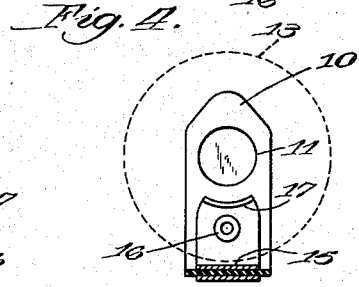
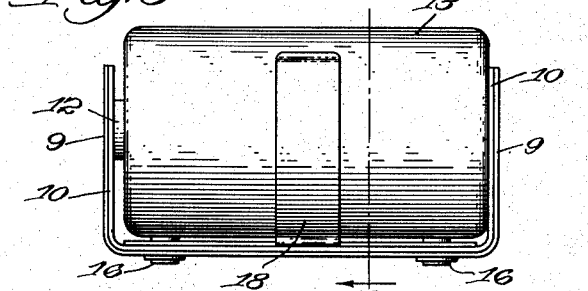
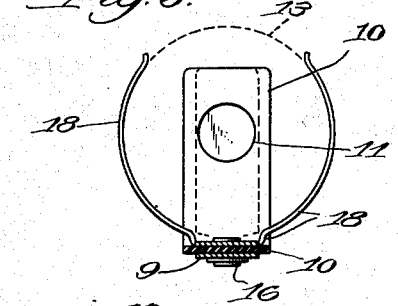
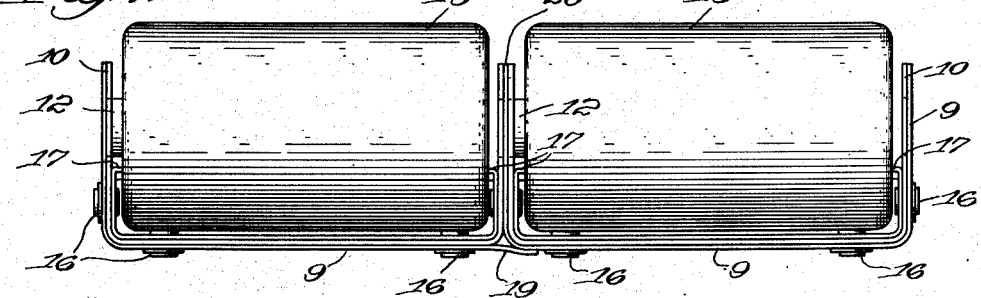
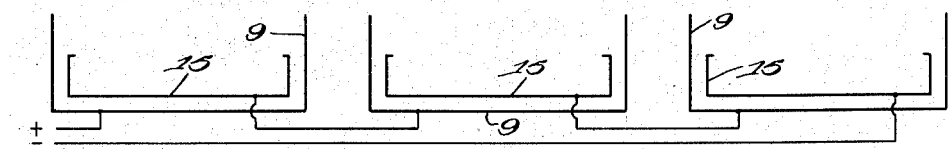
Inventor:
Leland A. Munchow.
By Chritton, Wiles, Davis, Hirsch & Dawson, Attys.

Patented Aug. 18, 1942

2,293,354

UNITED STATES PATENT OFFICE 2,293,354

CONSTANT-POLARITY HOLDER FOR DRY CELLS

Leland A. Munchow, Madison, Wis., assignor to Ray-O-Vac Company, a corporation of Wisconsin Application August 14, 1940, Serial No. 352,598

6 Claims. (Cl. 136—171)

This invention relates to terminal holders for dry cells wherein the polarity of the current from the holder will not be changed even though the cell is reversed in position.

The primary object of the invention is to provide a simple and inexpensive holder for a dry cell which is fool-proof as far as insertion of the dry cells is concerned. In many circuits, correct polarity must be maintained, such as in hearing aids, radios, test equipment, cells in series or parallel, and the like. Frequently such devices are used by persons unfamiliar with electricity, and a cell is installed upside down to the damage of other cells and associated equipment.

Another object of the invention is to provide a simple holder wherein the proper polarity is obtained and the cell will be securely held in position so that good connections will be maintained under severe conditions. For example, in hearing aid batteries it is important that the cell be firmly held, so that the resistance of the circuit will not change while the battery is carried around, for such changes result in annoying noises in the apparatus.

The invention is illustrated in several embodiments in the accompanying drawing, in which—

Figure 1 is a side elevational view of a holder for an interposed dry cell; Figure 2, an end elevational view of the same; Figure 3, a fragmentary sectional view, taken as indicated at line 3 of Figure 2; Figure 4, a sectional view, taken as indicated at line 4 of Figure 3; Figure 5, a side elevational view of the modified device wherein one of the contact members is provided with integrally formed spring fingers to engage the body of the cell; Figure 6, a sectional view, taken as indicated at line 6 of Figure 5; Figure 7, another modification in which several dry cell holders are connected in parallel; and Figure 8, a diagrammatic view showing how a plurality of dry cell holders may be connected in series.

In the embodiment illustrated in Figures 1-4, inclusive, an outer U-shaped contact 9 is arranged so that either of its arms is adapted to make contact with the central electrode of a dry cell interposed between said arms. The member is preferably made of resilient sheet metal such as brass. A strip of insulating material 10 forms a lining for the member 9 and extends substantially throughout its inner length. It is provided with cut-out portions 11 which form sockets to expose portions of the member 9 and permit it to electrically engage the terminal 12 of dry cell 13. The other terminal 14 of the dry cell, which is usually its bottom, is prevented from coming in contact with the member 9, at any time, by the insulating strip 11.

An inner U-shaped contact member 15 is secured to the contact 9 by means of insulated grommet members 16. These latter members may be conveniently used for connecting lead wires to the inner contact of the holder. The upper ends of the arms of the inner contact have inturned lips 17 which are adapted to engage only the bottom 14 of the dry cell.

In the form shown in Figure 5, the central terminal 12 of the dry cell is adapted to engage the contact 9 through perforations in the insulating strip 10, as described above. However, contact with the other electrode of the dry cell is made by means of resilient spring fingers 18 which are adapted to grip the exposed body of the cell. It will be understood that in this form the usual cardboard cover of the dry cell must be removed.

In the form shown in Figure 7, the holders are connected in parallel by means of a connection 19 between the members 9. With this arrangement a single resilient arm 20 serves as a contact for either of the holders. It will be understood that as many additional holders may be connected in a battery, in this manner, as may be desired. Also, it is not necessary that the opposed contacts of the holder be integrally formed, as they may be made in separate contacting units secured to a suitable base member.

Figure 8 illustrates diagrammatically how many desired number of holders may be connected in series by connecting member 15 to the member 9 of the next holder.

The foregoing detailed description has been given for clearness of understanding only, and no unnecessary limitations should be understood therefrom for some modifications will be obvious to those skilled in the art.

I claim:

1. A constant-polarity terminal holder for a dry cell comprising: a pair of heads oppositely disposed to engage either end of the dry cell interchangeably, each of said heads having two contacts separated by a perforated strip of insulating material, the perforation in said material being adapted to receive loosely and center the exposed central electrode of a dry cell, one of said contacts having an exposed conducting area disposed in rear of one of said perforations so as to engage a central electrode inserted therethrough, and the other contact on the head disposed to engage only the bottom of the dry cell.

2. A device as specified in claim 1, in which the opposed pair of inner contacts engaging the bottom of the cell are integrally formed, and the outer contacts for engaging the central electrode are formed integrally from a single strip of metal.

3. A constant-polarity terminal holder for a dry cell comprising: an outer U-shaped contact of resilient metal adapted at either end to engage only the central electrode of an interposed dry cell; a strip of insulating material lining said outer contact and having cut-out socket portions exposing opposite areas of the arms of the contact and serving to position the central electrode of a cell when inserted therethrough; and an inner U-shaped contact of resilient metal having centrally disposed short arms with contacting lips to engage only the bottom of said cell if presented thereto, said contacts being secured together in electrically insulated spaced relation.

4. A constant-polarity terminal holder for a dry cell comprising: a U-shaped contact of resilient metal adapted to embrace opposed ends of a dry cell; a lining of insulating material for said contact having at each end a centrally disposed cut-out portion forming a socket adapted to receive and center the end of the central terminal of the dry cell and permit said terminal to make electrical connection with said U-shaped contact; and a second contact secured to said insulating strip and having arms adapted to engage an electrically conductive outer wall of the cell when the first mentioned contact is connected to said cell.

5. A device as specified in claim 4, in which the second contact has arms disposed to engage an end wall of the cell beneath its center and opposite from the end of the cell engaged by the first mentioned contact.

6. A device as specified in claim 4, in which the second contact has arcuate fingers adapted to engage and make electrical contact with the side wall of the cell.

LELAND A. MUNCHOW.